United States Patent
Hussain

(10) Patent No.: US 11,782,635 B2
(45) Date of Patent: Oct. 10, 2023

(54) METHOD TO ENSURE MESSAGE ARRIVAL BEFORE A MESSAGE POINTER

(71) Applicant: Western Digital Technologies, Inc., San Jose, CA (US)

(72) Inventor: Atif Hussain, Longmont, CO (US)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 58 days.

(21) Appl. No.: 17/525,790

(22) Filed: Nov. 12, 2021

(65) Prior Publication Data

US 2023/0153015 A1     May 18, 2023

(51) Int. Cl.
   *G06F 3/06*     (2006.01)

(52) U.S. Cl.
   CPC .......... *G06F 3/0655* (2013.01); *G06F 3/0604* (2013.01); *G06F 3/0659* (2013.01); *G06F 3/0679* (2013.01)

(58) Field of Classification Search
   CPC .... G06F 3/0604; G06F 3/0655; G06F 3/0659; G06F 3/0679
   See application file for complete search history.

(56) References Cited

U.S. PATENT DOCUMENTS

| | | | |
|---|---|---|---|
| 5,781,741 A | 7/1998 | Imamura et al. | |
| 5,983,292 A | 11/1999 | Nordstrom et al. | |
| 7,937,532 B2 | 5/2011 | Kunze et al. | |
| 8,924,619 B2 | 12/2014 | Cohen et al. | |
| 9,274,859 B2 | 3/2016 | Avkarogullar | |
| 2019/0370199 A1* | 12/2019 | Tomlin | G06F 3/0659 |
| 2021/0240394 A1* | 8/2021 | Mahurin | G06F 3/0659 |

* cited by examiner

*Primary Examiner* — Jane W Benner
(74) *Attorney, Agent, or Firm* — ARENTFOX SCHIFF LLP

(57) ABSTRACT

Aspects of a storage device are provided that allows a controller to prevent message pointers from being stored in controller memory prior to associated messages due to race conditions, bus arbitration, or similar circumstances. The storage device may include hardware that routes order-sensitive transactions including messages to a first memory and order-sensitive transactions including message pointers to a second memory. The messages and message pointers may be provided from a first processor of the controller to a second processor of the controller. The hardware may hold delivery of each message pointer to the second memory until a delivery acknowledgement of an associated message is received from the first memory. The hardware may also route order-insensitive transactions including other instructions to a third memory different than the first and second memories without holding delivery. As a result, order-sensitive transactions may processed in the order received, without delaying processing of order-insensitive transactions.

20 Claims, 9 Drawing Sheets

METHOD TO ENSURE MESSAGE ARRIVAL BEFORE A MESSAGE POINTER

BACKGROUND

Field

This disclosure is generally related to electronic devices and more particularly to storage devices.

Introduction

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. This control tables are used to track the physical location of logical sectors, or blocks, in the flash memory. The control tables are stored in the non-volatile memory to enable access to the stored data after a power cycle.

The flash storage device may construct and provide messages and message pointers. A message may indicate at least a logical and physical address in the flash memory in which host data is to be read or written in response to a host command, and a message pointer may indicate an associated message is available for processing. When the flash storage device provides a message and message pointer to be stored in memory, there is no guarantee that the message will arrive in memory before its associated message pointer. For example, a race condition may occur where the message pointer arrives before its associated message. As a result, the message pointer may indicate the wrong message as available for processing, causing the flash storage device to read or write data incorrectly in the flash memory.

SUMMARY

One aspect of a storage device is disclosed herein. The storage device includes a first processor, a second processor, and a plurality of memories. The first processor is configured to provide a plurality of transactions to the second processor, where the transactions include an order-sensitive transaction associated with a first destination memory address and an order-insensitive transaction associated with a second destination memory address. The memories comprise a first memory including the first destination memory address and a second memory including the second destination memory address. The storage device further includes hardware configured to route the order-sensitive transaction to the first memory in response to the first destination memory address matching one of a plurality of configured memory addresses, and to route the order-insensitive transaction to the second memory in response to the second destination memory address not matching any of the configured memory addresses.

Another aspect of a storage device is disclosed herein. The storage device includes a first processor, a second processor, and a plurality of memories. The first processor is configured to provide a message associated with a first destination memory address and a message pointer associated with a second destination memory address. The memories comprise a first memory including the first destination memory address for storing the message and a second memory including the second destination memory address for storing the message pointer. The storage device further includes hardware configured to route the message to the first memory in response to the first destination memory address being within a range of configured memory addresses, to route the message pointer to the second memory in response to the second destination memory address being within the range of configured memory addresses, and to hold delivery of the message pointer to the second memory until a delivery acknowledgement of the message is received from the first memory.

A further aspect of a storage device is disclosed herein. The storage device includes a controller and a plurality of memories. The controller comprises a front-end processor and a back-end processor, where the front-end processor is configured to provide a message associated with a first destination memory address, a message pointer associated with a second destination memory address, and an order-insensitive transaction associated with a third destination memory address. The plurality of memories comprise a first memory including the first destination memory address, a second memory including the second destination memory address, and a third memory including the third destination memory address. The storage device further includes hardware configured to route the message to the first memory in response to the first destination memory address being within a range of configured memory addresses, to route the message pointer to the second memory in response to the second destination memory address being within the range of configured memory addresses, and to route the order-insensitive transaction to the third memory in response to the third destination memory address not being within the range of configured memory addresses.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
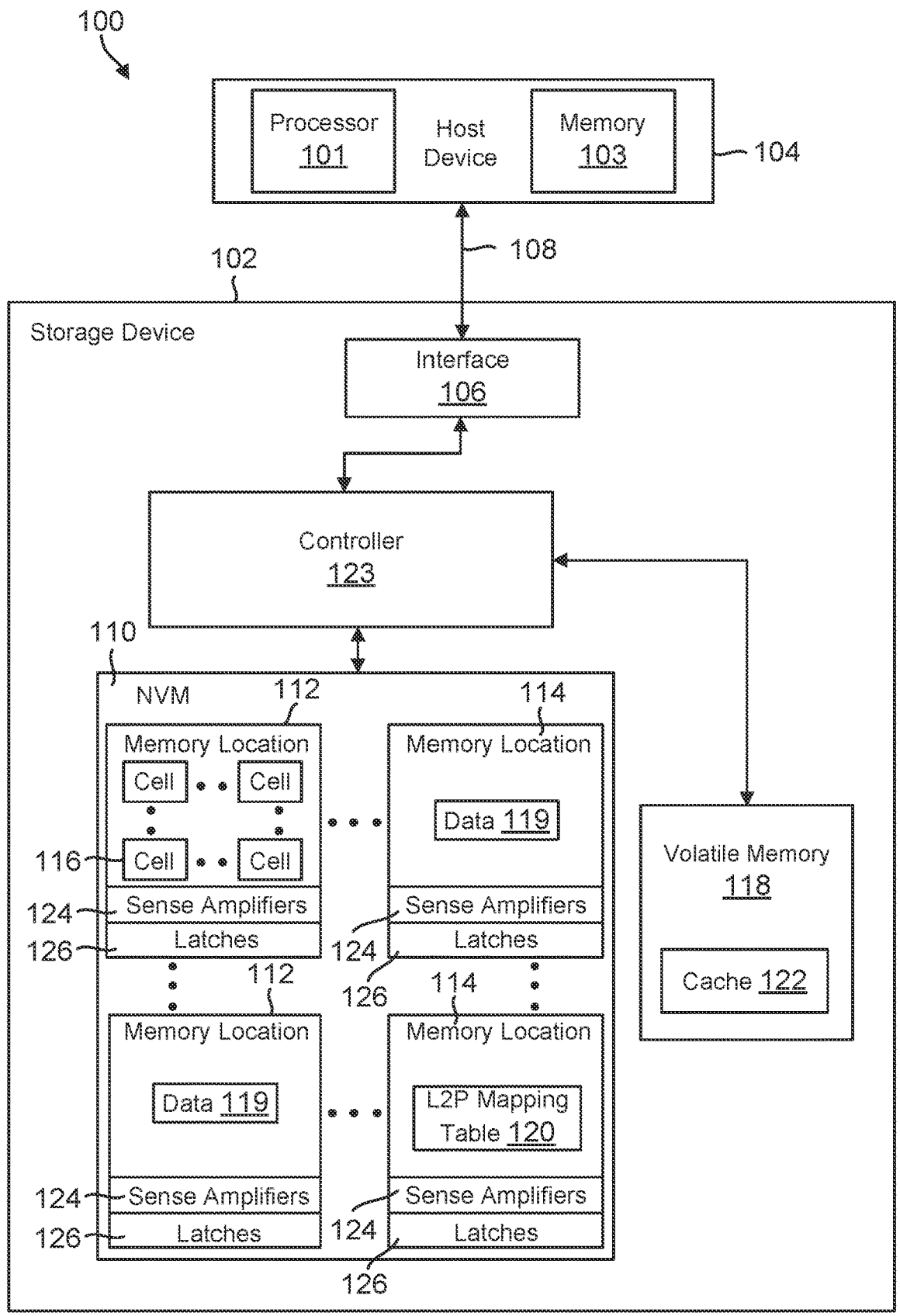
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

A controller of a storage device may include multiple processors, engines, or similar components that perform different processing functions. For instance, the controller may include a front-end processor which schedules work to be performed in the storage device (e.g., a processor that schedules sequential or random reads or writes), and a back-end processor which performs the scheduled work (e.g., a processor that reads or writes data in NAND). During processing of a host command, the front-end processor may construct a message or descriptor describing the work that the back-end processor is to perform for that host command (e.g., a message indicating to read or write a specified amount of data to a specified logical address and physical address of the flash memory), and a message pointer indicating an address in controller memory where that message is to be stored for subsequent processing. After constructing a message and message pointer, the front-end processor may provide respective transactions or instructions to the back-end processor to write the message and message pointer in different memories, for example, one transaction instructing the back-end processor to write the message into a descriptor random access memory (RAM) (or other memory) of the controller, and another transaction instructing the back-end processor to write the message pointer into a tightly coupled register (TCR) (or other memory) of the controller.

Once the back-end processor receives the transaction including the message, the back-end processor may store the message in the descriptor RAM (or other memory). Similarly, once the back-end processor receives the transaction including the message pointer, the back-end processor may store the message pointer in the TCR (or other memory). After the message pointer is stored, the message pointer may act as a doorbell informing the back-end processor that the associated message in memory is ready for processing. In response to this doorbell, the back-end processor may fetch the message from its associated memory (e.g., the address in descriptor RAM indicated by the message pointer), and the back-end processor may process the message by reading or writing data in the flash memory.

Transactions which instruct a processor to write messages and message pointers to memory are order-sensitive (e.g., a message should be stored in memory before the associated message pointer to successfully operate the storage device). To achieve this result, the front-end processor may send the transaction including the message prior to the transaction including the associated message pointer, so that the back-end processor may receive the message prior to the message pointer and attempt to store the message in the descriptor RAM prior to storing the message pointer in the TCR. However, a race condition or other circumstance may still arise that causes the message pointer to be stored before its associated message. For example, if other processors in the storage device contend for usage of the bus connected to the descriptor RAM, bus arbitration may delay or block a message from being stored in memory prior to the associated message pointer. As a result, once the message pointer is stored, the doorbell effect of the stored message pointer may cause the back-end processor to acquire and process the wrong message from the descriptor RAM (e.g., an old message stored at the address indicated in the message pointer), resulting in the back-end processor performing incorrect operations in NAND as a result.

One approach that is typically used to resolve this problem is to incorporate a memory synchronization barrier (also referred to as a data synchronization barrier) in the firmware or software of the front-end processor. A memory synchronization barrier or data synchronization barrier (collectively referred to throughout this disclosure as "a memory barrier") is an instruction or set of instructions in firmware or software that causes a processor to halt processing subsequent instructions until a conditional event occurs. For instance, after the front-end processor sends a message to the back-end processor as previously described, the front-end processor may execute a memory barrier which halts further processing until it receives a delivery acknowledgment of the message from the back-end processor. After this conditional event occurs (e.g., the delivery acknowledgment of the message is received), the front-end processor may send the associated message pointer to the back-end processor. Thus, memory barriers may prevent the aforementioned race conditions or similar circumstances from occurring by ensuring the message pointer is sent only after the message is stored. Nevertheless, as memory barriers are designed to halt processing of all subsequent instructions, these memory barriers may inefficiently stall the front-end processor from performing other work until after the delivery acknowledgment is received, thereby reducing performance of the storage device.

Another approach that is typically used to ensure storage of messages before message pointers is to incorporate a proxy block in the controller. A proxy block is a firmware, software, and/or hardware module that associates and caches messages and message pointers for future delivery. For instance, the proxy block may be configured to associate messages and message pointers received from the front-end processor, to cache the associations of message pointers and messages in a look-up table, and to provide messages prior to associated message pointers in the look up table to the back-end processor. The proxy block is coupled between the front-end processor and the back-end processor (e.g., as an "intermediate" block), and the proxy block may receive multiple messages and message pointers from the front-end processor in parallel to be associated and cached. Thus, the proxy block may engage in a time-consuming and complicated process of correctly associating and caching numerous received messages with numerous received message pointers prior to their transmission to the back-end processor, thereby increasing transaction latencies. Moreover, the proxy block may implement an inefficient memory barrier (similar to the memory barrier of the front-end processor described above) to prevent message pointers from being stored in memory before associated messages, further delaying the execution of various transactions.

Accordingly, it would be helpful to allow a storage device to more efficiently prevent messages and associated message pointers from being stored in memory in a different order than that received compared to typical approaches incorporating memory barriers and proxy blocks. More generally, it would be helpful to provide a more efficient solution to the problem of out-of-order processing of order-sensitive transactions between multiple processors, engines, or other processing components of a controller of a flash storage device. To this end, aspects of the present disclosure incorporate hardware in the back-end processor of the controller which routes order-sensitive transactions (e.g., instructions which should be processed in order of receipt, such as instructions to store messages before associated message pointers) in a different path to memory than order-insensitive transactions (e.g., instructions which may be processed in a different order than received). For instance, order-sensitive transactions may include instructions to write messages or descriptors to memory, instructions to write message pointers to memory, instructions which directly involve reading, writing, or erasing data in flash memory, or other instructions which should be processed in order of receipt, while order-insensitive transactions may include instructions that do not directly involve reading, writing, or erasing data in flash memory, such as load register instructions, store register instructions, add instructions, error correction code (ECC) or decoding-related instructions, status checks, instructions that involve reading or writing data in a memory of another processor or engine (rather than in flash memory), or other instructions which can be processed in a different order than that received.

To route order-sensitive and order-insensitive transactions appropriately, during initialization of the storage device, the controller may program a configuration register with the addresses of the memories corresponding to the order-sensitive transactions (e.g., the descriptor RAM for messages and the TCR for message pointers). During run-time, when the hardware receives a transaction, the hardware first compares a destination address associated with the transaction with the configured addresses in the configuration register, and if there is a match (e.g., the transaction is an order-sensitive transaction), the hardware routes that transaction down one path; otherwise, if there is not a match (e.g., the transaction is an order-insensitive transaction), the hardware routes that transaction down a different path. For example, during initialization, the configuration register may be programmed with an address range including the memory addresses in the descriptor RAM and the TCR, and during run-time, a switch in the hardware may route transactions including messages and message pointers (intended for the descriptor RAM and TCR) down one path through the hardware, and transactions including other information (intended for a different memory) down another path through the hardware.

The hardware may also include a buffer which controls the transmission of order-sensitive transactions in a first-in-first-out manner (FIFO). For instance, after the hardware routes a current order-sensitive transaction down its respective path, the order-sensitive transaction may be stored in a FIFO buffer behind previous order-sensitive transactions. Each order-sensitive transaction in the buffer is output for transmission to the back-end processor one transaction at a time, in response to a delivery acknowledgment from the associated destination for a previous order-sensitive transaction (e.g., the descriptor RAM or TCR). Once all previous order-sensitive transactions in the buffer are output in response to respective delivery acknowledgments, the current order-sensitive transaction may be output for transmission to the back-end processor, ensuring that these transactions are processed (e.g., messages and message pointers are stored) in the order that they are received. For instance, if a message is received in the hardware prior to an associated message pointer, the message is stored in the FIFO buffer before the message pointer, ensuring that the message pointer is only sent to the back-end processor after a delivery acknowledgment of the associated message is received. In contrast, the hardware may not include this buffer for order-insensitive transactions routed down the different path, allowing these transactions to pass to the back-end processor at maximum throughput without the controlled buffering applied to order-sensitive transactions.

Thus, the hardware of the present disclosure may allow messages, message pointers, and other information in order-sensitive transactions to be stored in memory, in the order that the transactions were received, and in a faster and more efficient process than previous approaches (e.g., without the processor stalling or complicated firmware/software associated with memory barriers and proxy blocks). For example, implementing the hardware in the back-end processor, rather than between the front-end processor and back-end processor as with proxy blocks, may avoid or minimize the front-end stalling present in typical approaches. Moreover, the separate routing paths in the hardware may prevent information in order-insensitive transactions from being stalled while order-sensitive transactions are waiting in the FIFO buffer, thus maximizing the throughput of order-insensitive transactions while also preventing out-of-order processing of order-sensitive transactions. The implementation of the FIFO buffer in hardware may also allow order-sensitive transactions to be held, pending delivery acknowledgment of a prior transaction, for a shorter time than in the memory barriers present in typical approaches, thus reducing transaction latency. Furthermore, the hardware does not include the complicated caching and association firmware/software present in proxy blocks, simplifying implementation and further improving performance of the storage device.

Although the present disclosure primarily refers to a hardware solution to the aforementioned problem of out-of-order processing of order-sensitive transactions, including transaction address checking, routing and buffering in hardware, the address checking, routing and buffering may alternatively be implemented in software and/or firmware, or in a combination of software, firmware, and/or hardware.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the exemplary embodiment of FIG. 1, each memory location 112 may be a die 114 including multiple planes each including multiple blocks of multiple cells 116. Alternatively, each memory location 112 may be a plane including multiple blocks of the cells 116. The cells 116 may be single-level cells, multi-level cells, triple-level cells, quad-level cells, and/or penta-level cells, for example. Other examples of memory locations 112 are possible; for instance, each memory location may be a block or group of blocks. Each memory location may include one or more blocks in a 3-D NAND array. Each memory location 112 may include one or more logical blocks which are mapped to one or more physical blocks. Alternatively, the memory and each memory location may be implemented in other ways known to those skilled in the art.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
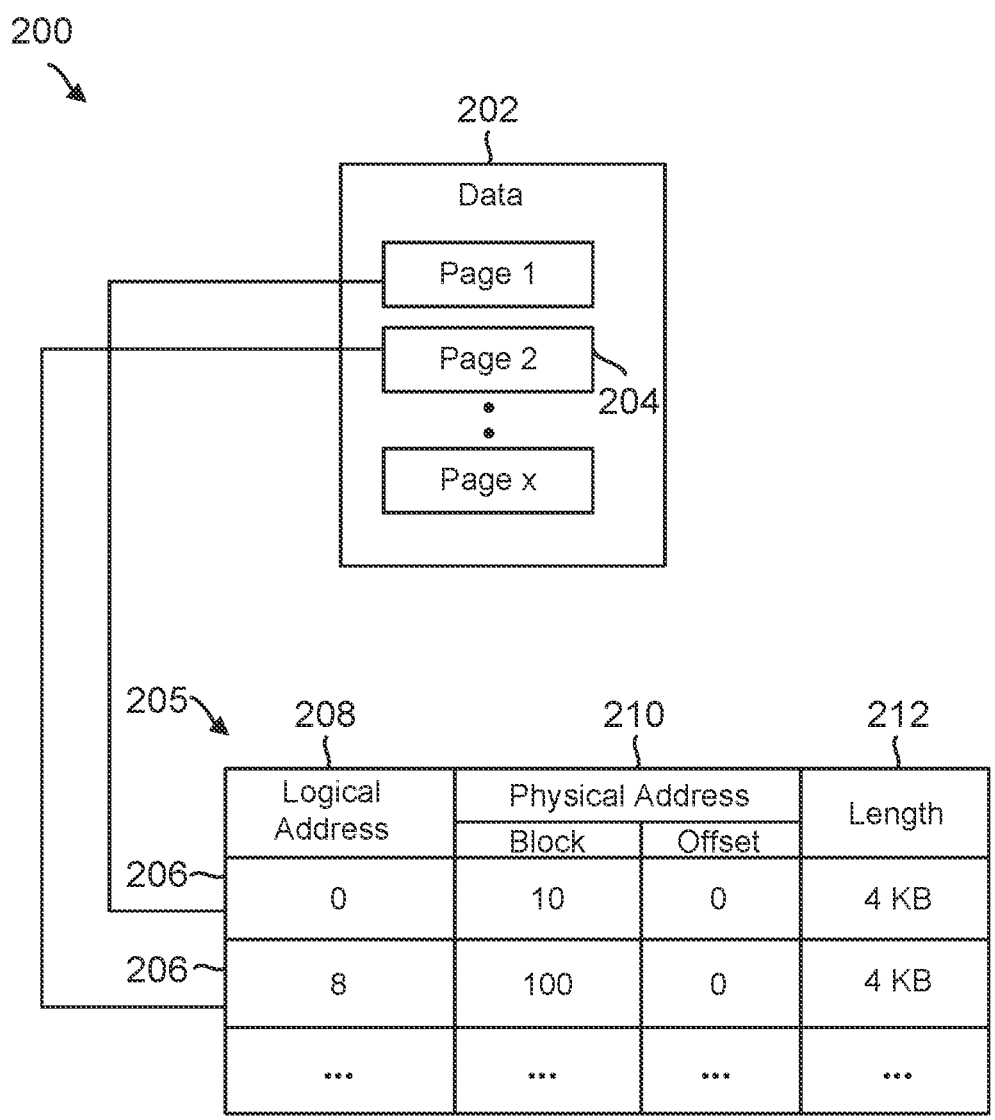
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 includes entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106.

Figure 3:
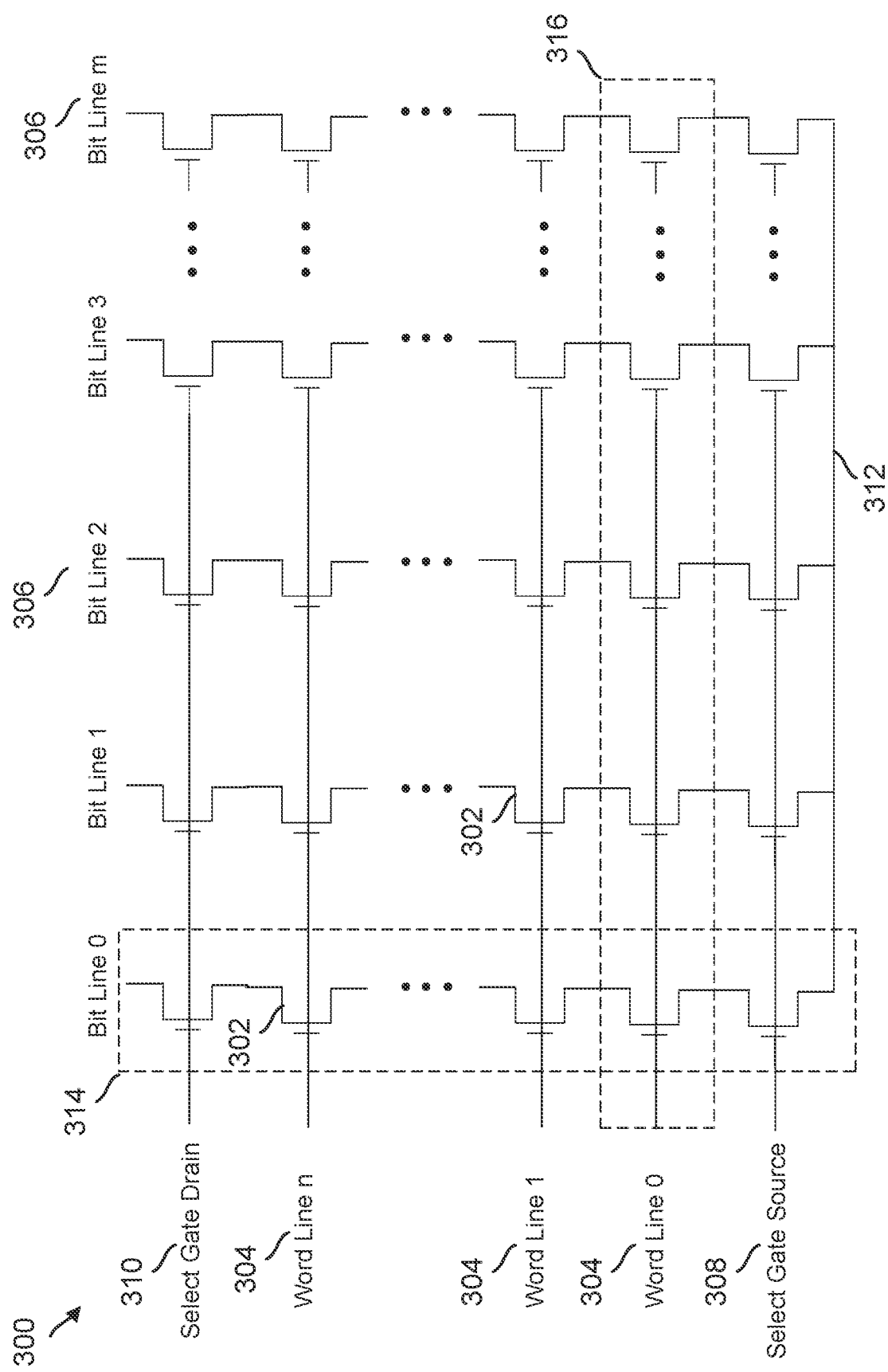
FIG. 3 is a conceptual diagram illustrating an example of an array of memory cells in the storage device of FIG. 1.

FIG. 3 illustrates an example of a NAND memory array 300 of cells 302. Cells 302 may correspond to cells 116 in the NVM 110 of FIG. 1. Multiple cells 302 are coupled to word lines 304 and bit lines 306. For example, the memory array 300 may include n word lines and m bit lines within a block of a die 114 of the NVM 110, where n and m are predefined according to the size of the block. Each word line and bit line may be respectively associated with a row and column address, which the controller 123 may use to select particular word lines and bit lines (e.g. using a row and column decoder). For example, word lines 0-n may each be associated with their own row address (e.g. word line 0 may correspond to word line address 0, word line 1 may correspond to word line address 1, etc.), and bit lines 0-m may each be associated with their own column address (e.g. bit line 0 may correspond to bit line address 0, bit line 1 may correspond to bit line address 1, etc.). Select gate source (SGS) cells 308 and select gate drain (SGD) cells 310 are coupled to the memory cells 302 on each bit line 306. The SGS cells 308 and SGD cells 310 connect the memory cells 302 to a source line 312 (e.g. ground) and bit lines 306, respectively. A string 314 may include a group of cells 302 (including SGS and SGD cells 308, 310) coupled to one bit line within a block, while a page 316 may include a group of cells 302 coupled to one word line within the block.

Figure 4:
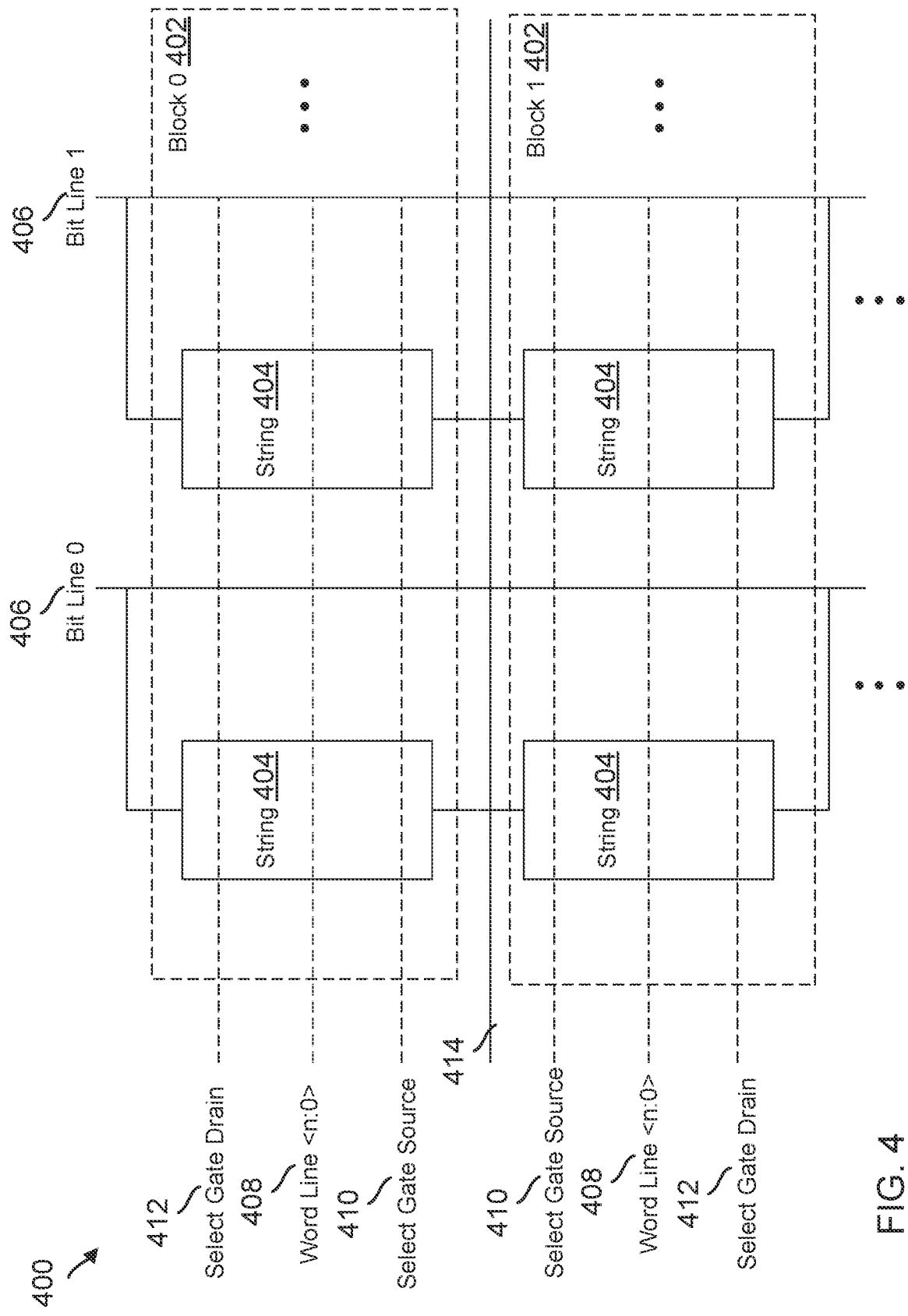
FIG. 4 is a conceptual diagram illustrating an example of an array of blocks in the storage device of FIG. 1.

FIG. 4 illustrates an example of a NAND memory array 400 of blocks 402 including multiple strings 404. Blocks 402 may correspond to blocks of a die 114 in the NVM 110 of FIG. 1, and strings 404 may each correspond to string 314 in FIG. 3. As in the memory array 300 of FIG. 3, each string 404 may include a group of memory cells each coupled to a bit line 406 and individually coupled to respective word lines 408. Similarly, each string may include a SGS cell 410 and SGD cell 412 which respectively connects the memory cells in each string 404 to a source line 414 and bit line 406.

When the controller 123 reads data from or writes data to a page 316 of cells 302 (i.e. on a word line 304, 408), the controller may send a command to apply a read voltage or program voltage to the selected word line and a pass through voltage to the other word lines. The read or programmed state of the cell (e.g. a logic '0' or a logic '1' for SLCs) may then be determined based on a threshold voltage of the cells 302. For example, during an SLC read operation, if the threshold voltage of a cell 302 is smaller than the read voltage (i.e. current flows through the cell in response to the read voltage), the controller 123 may determine that the cell stores a logic '1', while if the threshold voltage of the cell 302 is larger than the read voltage (i.e. current does not flow through the cell in response the read voltage), the controller 123 may determine that the cell stores a logic '0'. Similarly, during an SLC program operation, the controller may store a logic '0' by sending a command to apply the program voltage to the cell 302 on the word line 304, 408 until the cell reaches the threshold voltage, and during an erase operation, the controller may send a command to apply an erase voltage to the block 402 including the cells 302 (e.g. to a substrate of the cells such as a p-well) until the cells reduce back below the threshold voltage (back to logic '1').

For cells that store multiple bits (e.g. MLCs, TLCs, etc.), each word line 304, 408 may include multiple pages 316 of cells 302, and the controller may similarly send commands to apply read or program voltages to the word lines to determine the read or programmed state of the cells based on a threshold voltage of the cells. For instance, in the case of TLCs, each word line 304, 408 may include three pages 316, including a lower page (LP), a middle page (MP), and an upper page (UP), respectively corresponding to the different bits stored in the TLC. In one example, when programming TLCs, the LP may be programmed first, followed by the MP and then the UP. For example, a program voltage may be applied to the cell on the word line 304, 408 until the cell reaches a first intermediate threshold voltage corresponding to a least significant bit (LSB) of the cell. Next, the LP may be read to determine the first intermediate threshold voltage, and then a program voltage may be applied to the cell on the word line until the cell reaches a second intermediate threshold voltage corresponding to a next bit of the cell (between the LSB and the most significant bit (MSB)). Finally, the MP may be read to determine the second intermediate threshold voltage, and then a program voltage may be applied to the cell on the word line until the cell reaches the final threshold voltage corresponding to the MSB of the cell. Alternatively, in other examples, the LP, MP, and UP may be programmed together (e.g., in full sequence programming or Foggy-Fine programming), or the LP and MP may be programmed first, followed by the UP (e.g., LM-Foggy-Fine programming). Similarly, when reading TLCs, the controller 123 may read the LP to determine whether the LSB stores a logic 0 or 1 depending on the threshold voltage of the cell, the MP to determine whether the next bit stores a logic 0 or 1 depending on the threshold voltage of the cell, and the UP to determine whether the final bit stores a logic 0 or 1 depending on the threshold voltage of the cell.

Figure 5:
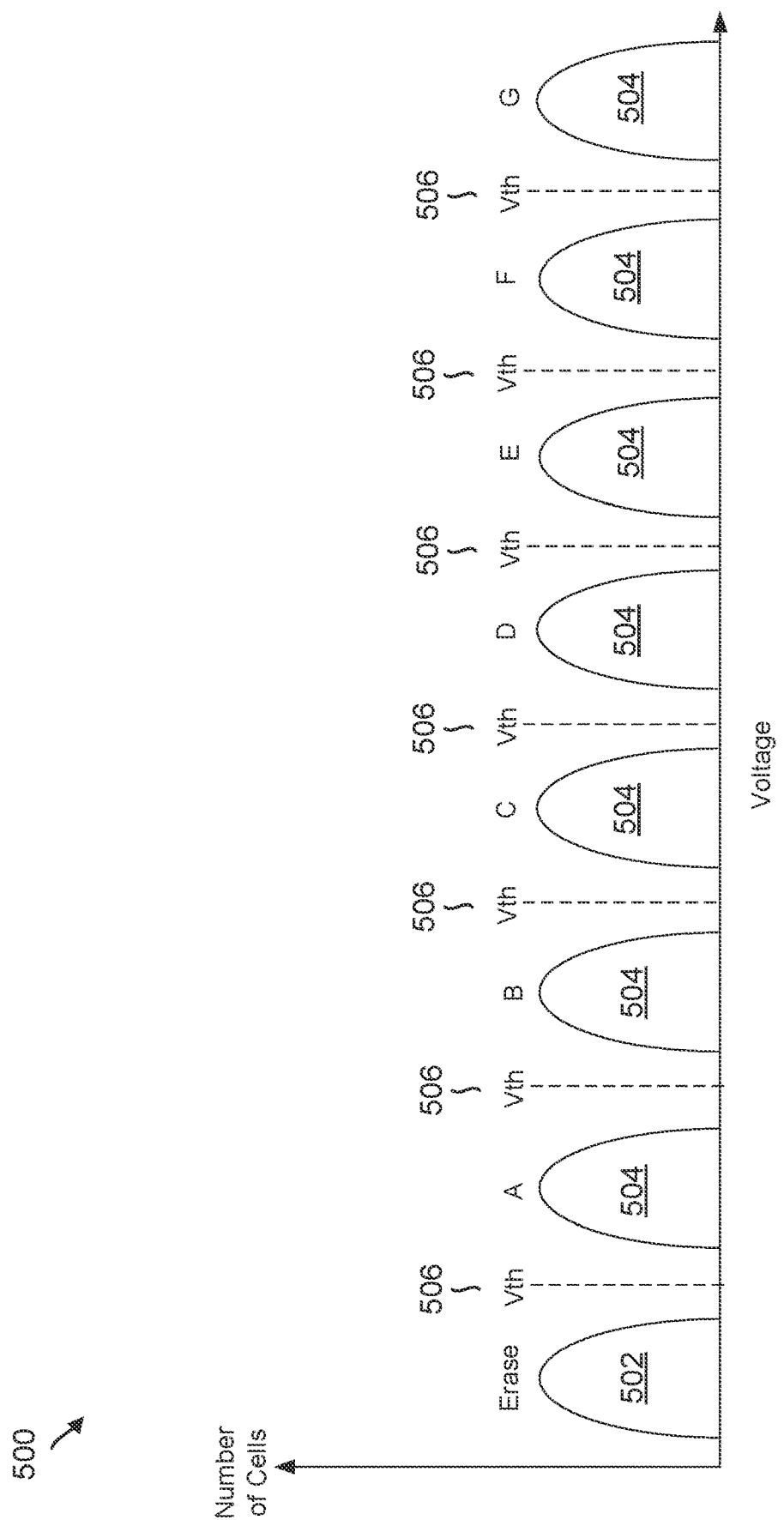
FIG. 5 is a graphical diagram illustrating an example of a voltage distribution chart for triple-level cells in the storage device of FIG. 1.

FIG. 5 illustrates an example of a voltage distribution chart 500 illustrating different NAND states for TLCs (e.g. cells 116, 302) storing three bits of data (e.g. logic 000, 001, etc. up to logic 111). The TLCs may include an erase state 502 corresponding to logic '111' and multiple program states 504 (e.g. A-G) corresponding to other logic values '000-110'. The program states 504 may be separated by different threshold voltages 506. Initially, the cells 116, 302 may be in the erase state 502, e.g. after the controller 123 erases a block 402 including the cells. When the controller 123 program LPs, MPs, and UPs as described above, the voltages of the cells 116, 302 may be increased until the threshold voltages 506 corresponding to the logic values to be stored are met, at which point the cells transition to their respective program states 504. While FIG. 5 illustrates eight NAND states for TLCs, the number of states may be different depending on the amount of data that is stored in each cell 116, 302. For example, SLCs may have two states (e.g. logic 0 and logic 1), MLCs may have four states (e.g. logic 00, 01, 10, 11), and QLCs may have sixteen states (e.g. erase and A-N).

Figure 6:
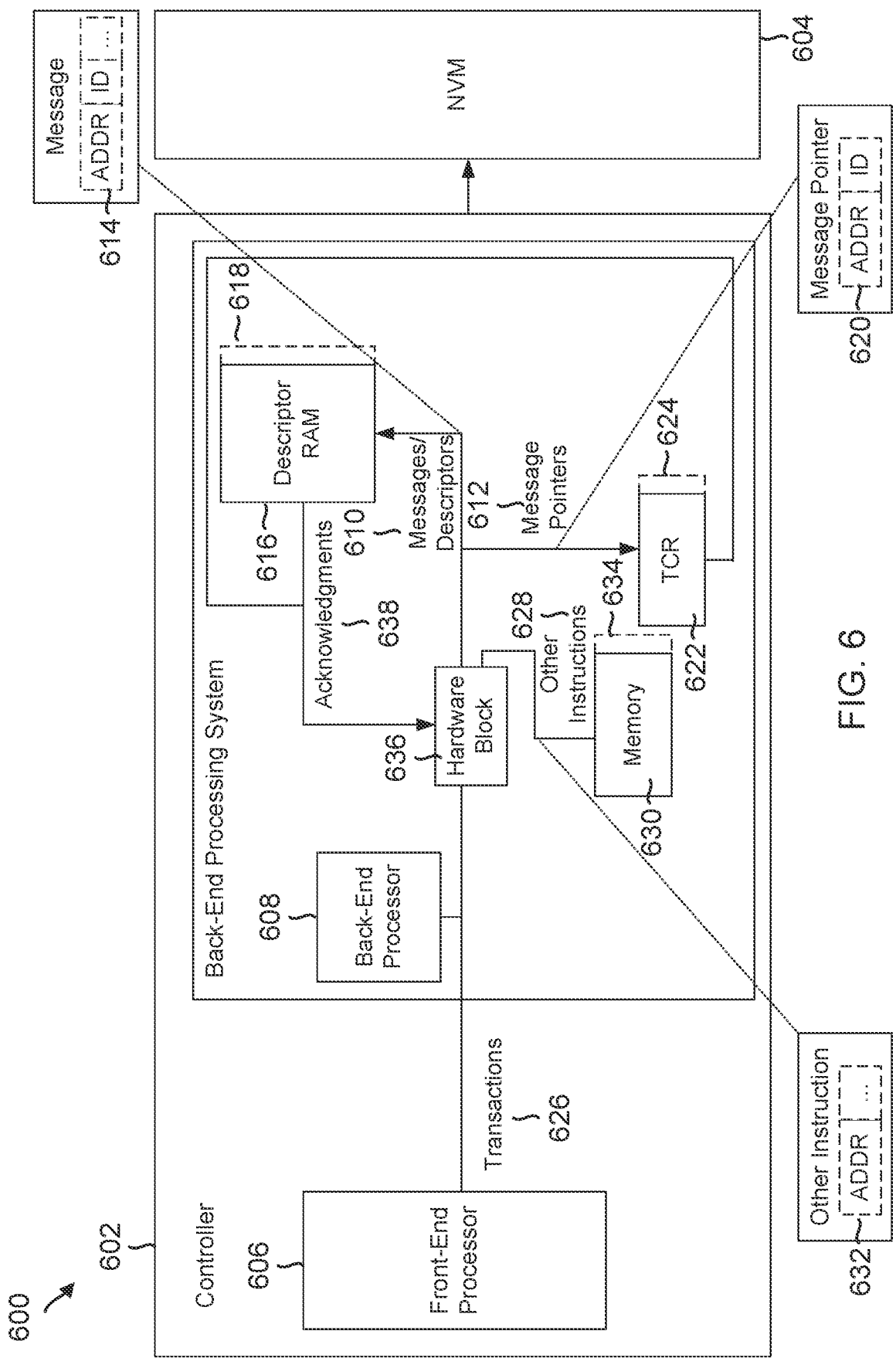
FIG. 6 is a conceptual diagram of a controller in the storage device of FIG. 1 including hardware that routes order-sensitive transactions including messages and message pointers, as well as order-insensitive transactions, to different memories of the controller for processing.

FIG. 6 illustrates an example 600 of a controller 602 of the storage device 102 which interfaces with a NVM 604. Controller 602 may correspond to controller 123 of FIG. 1, and NVM 604 may correspond to NVM 110 of FIG. 1. The controller 602 may include a front-end processor 606 and a back-end processing system including a back-end processor 608. The front-end processor 606 may schedule work for the back-end processor 608 to perform using messages 610 and message pointers 612. Each message 610 may include a message identifier and information describing one or more operations or work to be performed, including, for example, a read or write instruction and the logical addresses 208 and physical addresses 210 in which the back-end processor is to sense or program data 119 in cells 116, 302 of the NVM 604 as previously described. Each message 610 may also include a message address 614 in which the back-end processor is to store the message upon receipt. For instance, the back-end processing system may include a descriptor RAM 616 including a range of addresses 618 in which the back-end processor may store messages received from the front-end processor at the addresses 614 indicated in each message. Moreover, each message pointer 612 may include information describing a location in memory where an associated message is stored, including an address 620 corresponding to the message address 614 and an identifier corresponding to the message identifier. Each message pointer 612 may also act as a doorbell indicating the back-end processor to perform the operation(s) or work indicated in an associated message. For instance, the back-end processing system may include a TCR 622 including one or more addresses 624 in which the back-end processor may store a message pointer received from the front-end processor, and in response to storing the message pointer in the TCR, the back-end processor may be triggered to fetch the associated message from the descriptor RAM 616 for processing.

During operation, the front-end processor 606 may provide transactions 626 to the back-end processor 608 including scheduled instructions for the back-end processor to process. In one example, the transactions 626 may include instructions to write messages or message pointers to memory (or other order-sensitive transactions). For instance, after constructing messages 610 and message pointers 612 in response to a host command, the front-end processor 606 may provide transactions 626 to the back-end processor 608 instructing the back-end processor to write the messages 610 and message pointers 612 to the indicated addresses in the transactions. Due to the order sensitivity of these instructions (e.g., messages should be stored in memory before associated message pointers), the front-end processor may provide each message before its associated message pointer. For instance, the front-end processor may send one transaction including message 610 indicating the back-end processor to store the message at address 614 (in the range of addresses 618 of descriptor RAM 616), and subsequently another transaction including message pointer 612 indicating the back-end processor to store the message pointer at address 620 (in the one or more addresses 624 of TCR 622). In another example, the transactions 626 may include other instructions 628 than those related to messages and message pointers, such as load register instructions, store register instructions, add instructions, ECC or decoding-related instructions, status checks, etc. (or other order-insensitive transactions). In such case, the front-end processor may send these order-insensitive transactions including the other instructions 628 to the back-end processor, and the back-end processor may store information in these other instructions in a different memory 630 than the descriptor RAM 616 and TCR 622. Each other instruction 628 may also include an address 632 in which the back-end processor is to store the instruction or information included in the instruction upon receipt. Similarly, memory 630, which may include at least one memory within the back-end processing system or elsewhere in the controller, may include a range of addresses 634 different than the addresses 618, 624 of the descriptor RAM 616 and TCR 622. Thus, the front-end processor 606 may provide multiple transactions to the back-end processor 608 including various instructions intended for different memory destinations.

However, even though the front-end processor 606 may send, and thus the back-end processor 608 may receive, messages prior to associated message pointers, in some cases a message may be stored in memory after an associated message pointer. For instance, due to a race condition, bus arbitration, or a shorter path to the TCR than the descriptor RAM, message pointer 612 may end up being stored in the TCR 622 before the message 610 associated with message pointer 612 is stored in the descriptor RAM 616. As a result, when the back-end processor is triggered by message pointer 612 to fetch a message from the descriptor RAM 616 with the indicated message identifier and address 620, the back-end processor may fetch an old message (e.g., with the same message identifier) from that address in the descriptor RAM, leading to incorrect work being performed in the NVM 604. While the controller may attempt to prevent this situation from happening by implementing a memory barrier in the front-end processor 606 and/or a proxy block intermediate to the front-end processor and back-end processor 608 as previously described, such approaches may inefficiently result in front-end processor stalling, complicated and time-consuming caching and message to pointer association, and increased latency as also previously described.

Accordingly, to more efficiently prevent message pointers from being stored in memory prior to associated messages, the controller 602 may include a hardware block 636, 702 (see FIG. 7) that is configured to route the transactions 626 including messages 610 and message pointers 612 (or other order-sensitive transactions) to their intended destinations along a different path than that of order-insensitive transactions. Hardware block 636, 702 may be, for example, a module, chip (e.g., ASIC, FPGA, etc.), circuit, or other arrangement of electronic components (e.g., registers, buffers, comparators, wires, etc.) which is integrated in, or connectable to, the back-end processing system or back-end processor 608. While FIG. 6 illustrates the example where the hardware block 636, 702 specifically routes order-sensitive transactions to descriptor RAM 616 (for messages), TCR 622 (for message pointers), and memory 630 (for other instructions 628), the hardware may route this information respectively to other destinations in other examples (e.g., to controller memory, e.g., RAM, or to some other target memory or memories).

Figure 7:
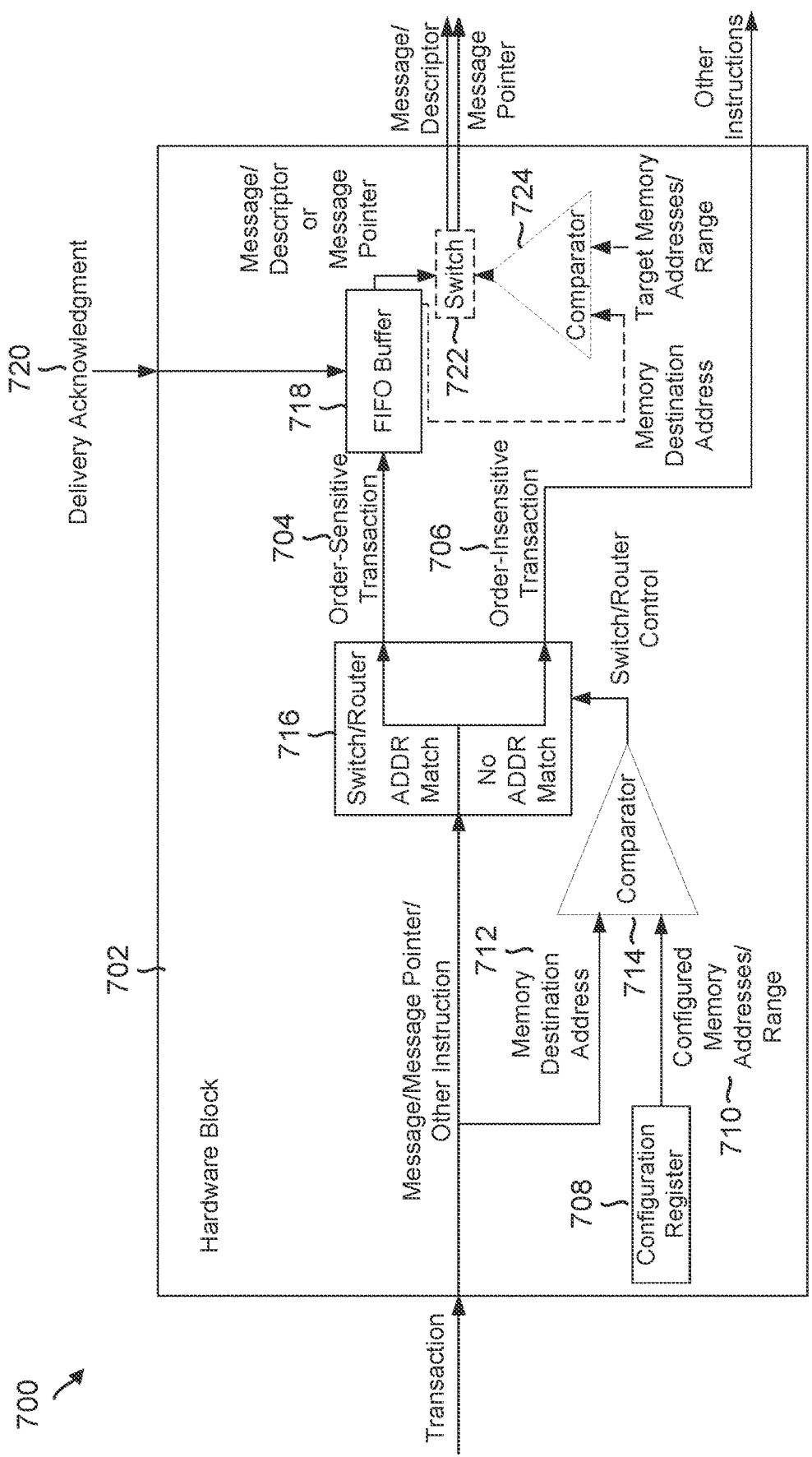
FIG. 7 is a conceptual diagram of an example of the hardware in FIG. 6.

FIG. 7 illustrates an example 700 of hardware block 702 (e.g., hardware block 636 in FIG. 6) in the controller (e.g., controller 123, 602) which may route transactions (e.g., transactions 626 in FIG. 6) to different destinations for processing. For instance, hardware block 702 may route order-sensitive transactions 704 (e.g., transactions including messages 610 and message pointers 612 in FIG. 6) and order-insensitive transactions 706 (e.g., transactions including other instructions 628 in FIG. 6) to different memories of the controller for processing (e.g., descriptor RAM 616, TCR 622, and memory 630 in FIG. 6). Alternatively, the hardware block 702 may route the different types of transactions to different processors, engines, or other destinations than controller memory. While the illustrated example of hardware block 702 includes specific components (e.g., register, comparators, switch, wires, inputs, outputs, etc.) arranged in a specific manner, the hardware block 702 is not limited to these components and arrangement; for example, the hardware block may include different components and/or a different arrangement of components in other examples.

During initialization or other configuration time prior to run-time of the storage device, the controller 602 may program the addresses 618, 624 of the descriptor RAM 616 and TCR 622, or the memory addresses of other destinations or target memories for order-sensitive transactions (but not those for order-insensitive transactions such as addresses 634 of memory 630), in a configuration register 708 coupled to the hardware block (e.g., included in, or connected to, hardware block 702). In one example, to save memory and time in programming the configuration register 708, the controller may program a single address range encompassing the addresses 618, 624 (e.g., if these addresses are contiguous within a given range). In other examples, the controller may program the configuration register 708 with individual memory addresses, multiple address ranges (e.g., if the addresses are not contiguous), or a combination of individual addresses and multiple address ranges, such that the configuration register encompasses addresses 618, 624 (or other target memory addresses). Thus, the configuration register 708 may include configured memory addresses 710 (or address range(s)) prior to run-time of the storage device.

During run-time, the hardware block 702 receives a transaction from the front-end processor including a memory destination address 712 (e.g., one of the addresses 614, 620, or 632). Then, a comparator 714 in the hardware block (or similar structure) compares the memory destination address 712 with the configured memory addresses 710. If the memory destination address 712 is encompassed within the configured memory addresses 710 (e.g., memory destination address 712 is within addresses 618 or 624 and thus an address match is present), a switch 716 (or similar structure) in the hardware block may route the transaction as order-sensitive transaction 704 through one path of the hardware block. For example, the output of comparator 714 may serve as a switch/router control which triggers switch 716 to direct the received transaction along the top path of hardware block 702 in FIG. 7. Alternatively, if the memory destination address 712 is not encompassed within the configured memory addresses 710 (e.g., memory destination address 712 is within addresses 634 or some other address not within addresses 618, 624 and thus no address match is found), then the switch 716 (or similar structure) in the hardware block may route the transaction as order-insensitive transaction 706 through a different path of the hardware block. For example, the output of comparator 714 may serve as a switch/router control which triggers switch 716 to direct the received transaction along the bottom path of hardware block 702 in FIG. 7. Thus, order-sensitive transactions including messages 610 and message pointers 612 may be routed along a different path in the hardware block than order-insensitive transactions including other instructions 628. This different path may facilitate independent handling of order-sensitive and order-insensitive transactions, as described in more detail below.

The hardware block may also include a buffer 718 which receives order-sensitive transactions 704 routed from the switch 716. The buffer 718 may be, for example, one or more shift registers or other hardware component(s) which operate in a FIFO manner, such that the first transaction to be input to the buffer is the first transaction to be output from the buffer. Moreover, the buffer 718 may be controlled to output a different transaction from the buffer in response to a delivery acknowledgment 720 for a previous transaction output from that buffer. For example, referring back to FIG. 6, whenever a message is stored in descriptor RAM 616 or a message pointer is stored in TCR 622, the descriptor RAM or TCR may respectively provide an acknowledgment 638 to hardware block 636 confirming that the message or message pointer was successfully stored. The delivery acknowledgment 638, 720 may in turn be received by the buffer 718, which triggers the buffer to output a subsequent transaction. For example, if the buffer is implemented as one or more shift registers which outputs a next transaction in response to each clock cycle, the delivery acknowledgment may be received as the clock input to those shift register(s).

As an example of operation, the hardware block 702 may receive transactions including the following information, in order: message (ID: 2) targeting address 1, message pointer (ID: 2) targeting address 2, message (ID: 1) targeting address 3, and message pointer (ID: 1) targeting address 4. If the configuration register 708 is programmed with an address range including addresses 1-4, the comparator 714 may control the switch 716 to output each of these transactions as order-sensitive transactions 704 to the buffer 718, in the same order. Thus, message (ID: 2) targeting address 1 will be first input to and first output from the buffer, message pointer (ID: 2) targeting address 2 will be second input to and second output from the buffer, and so forth. Since message (ID: 2) targeting address 1 is first to be output from the buffer, that message will be routed to its destination (e.g., descriptor RAM 616). After the message is stored in the target address, the target (e.g., descriptor RAM 616) will return delivery acknowledgment 638, 720 to the buffer 718. In response to delivery acknowledgment 638, 720, the buffer 718 will next output message pointer (ID: 2) targeting address 2, which will then be routed to its destination as well (e.g., TCR 622). After the message pointer is stored in the target address, the target (e.g., TCR 622) will return delivery acknowledgment 638, 720 to the buffer 718, and the aforementioned process may repeat for other transactions in the buffer. Thus, the hardware block 702 may allow only a single order-sensitive transaction from being released from buffer 718 at a given time.

Additionally, after the buffer 718 outputs an order-sensitive transaction in response to delivery acknowledgment 720, the information in the transaction (e.g., the message 610 or message pointer 612) may be routed to its respective destination in the controller 602. In one example, this destination routing may be performed in the hardware block 702, for example, using one or more electronic components such as another switch 722 and comparator 724. For instance, referring to FIG. 7, the comparator 724 may compare the memory destination address 712 in the transaction to be output from buffer 718 with one or more target addresses (e.g., a range of addresses) corresponding to a target memory, and the switch 722 may direct the transaction to one of the targets in response to the comparison. For example, the comparator may compare the memory destination address 712 with the addresses 618 of the descriptor RAM 616, and if there is a match (e.g., the transaction includes a message intended for the descriptor RAM), the switch may be controlled to output the transaction to the descriptor RAM, while if there is not a match (e.g., the transaction includes a message pointer intended for the TCR), the switch may be controlled to output the transaction to the TCR. In other examples, the destination routing may be performed outside the hardware block 702 (e.g., elsewhere in the back-end processing system).

Thus, when order-sensitive transactions are input into the buffer 718 from the corresponding output of the switch 716 (e.g., the top path from the switch illustrated in FIG. 7), each transaction is maintained in the buffer 718 until the information in a previous transaction (e.g., a previous message or message pointer) is stored in a respective destination address. Since the front-end processor provides transactions including messages before transactions including associated message pointers, the buffer 718 will store each message prior to each associated message pointer in the order they were received. Moreover, since the buffer 718 outputs each transaction in response to delivery acknowledgment of a prior transaction, the buffer will output a message pointer to be stored in memory only after its associated message is stored in memory. As a result, the hardware block may prevent out-of-order delivery of order-sensitive transactions to their respective destination memories (e.g., the descriptor RAM and TCR), thereby avoiding or minimizing the risk of the back-end processor reading or writing data incorrectly to the NVM in response to prematurely stored message pointers. Moreover, since the buffer only affects order-sensitive transactions and not order-insensitive transactions (e.g., hardware block 702 does not include a buffer such as buffer 718 coupled to the bottom path from switch 716), these transactions including other instructions may be delivered to their destination with maximum throughput without being stalled by the buffering of order-sensitive transactions.

Figure 8:
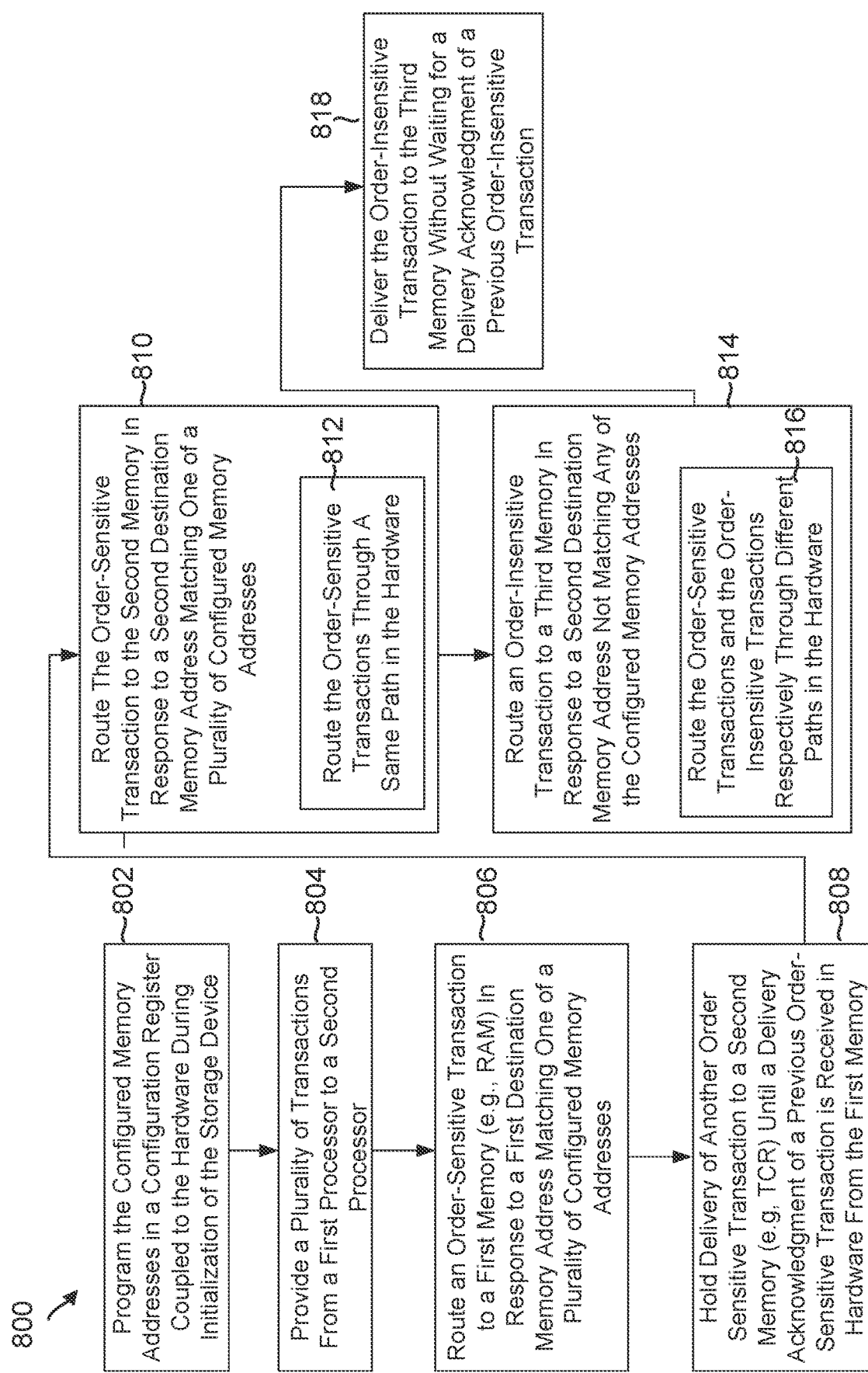
FIG. 8 is a flow chart illustrating an example of a method for routing order-sensitive transactions and order-insensitive transactions to different memories, as performed by the storage device of FIG. 1.

FIG. 8 illustrates an example flow chart 800 of a method for routing order-sensitive transactions and order-insensitive transactions to different memories. For example, the method can be carried out in a storage device 102 such as the one illustrated in FIG. 1. Each of the steps in the flow chart can be controlled using the controller as described below (e.g. controller 123, 602), by a component or module of the controller, or by some other suitable means.

As represented by block 802, a first processor or a second processor of the controller may program a plurality of configured memory addresses in a configuration register coupled to hardware (e.g., a hardware block of the controller) during initialization of the storage device. For instance, referring to FIGS. 6 and 7, front-end processor 606 or back-end processor 608 of controller 602 may program configured memory addresses 710 (e.g., range of addresses 618, 624) in configuration register 708 during initialization of storage device 102. The configuration register 708 may be coupled to hardware block 636, 702.

As represented by block 804, the controller may provide a plurality of transactions from the first processor to the second processor. The transactions may include an order-sensitive transaction associated with a first destination memory address and an order-insensitive transaction associated with a second destination memory address. The order-sensitive transaction may include a descriptor or a descriptor pointer. For instance, referring to FIGS. 6 and 7, controller 602 may provide transactions 626 from front-end processor 606 to back-end processor 608. The transactions may include order-sensitive transactions 704 and order-insensitive transactions 706 each associated with different memory destination addresses 712. For instance, an order-sensitive transaction may include address 614 or address 620, while an order-insensitive transaction 706 may include address 632. The order-sensitive transaction may also include a descriptor (message 610) or descriptor pointer (message pointer 612).

As represented by block 806, the controller may route the order-sensitive transaction to a first memory in response to the first destination memory address matching one of the configured memory addresses (e.g., being within a configured memory address range). The first memory may comprise a RAM for storing the descriptor. For instance, referring to FIGS. 6 and 7, controller 602 may include hardware (e.g., hardware block 636, 702) which routes order-sensitive transactions 704 including messages 610 to descriptor RAM 616. The routing may be performed by, for example, switch 716, which is in turn controlled by comparator 714, and the comparator may trigger the switch to route an order-sensitive transaction along the top path of FIG. 7 in response to the memory destination address 712 of that transaction matching one of the configured memory addresses 710 (e.g., being within range of addresses 618).

As represented by block 808, the controller may hold delivery of the order-sensitive transaction to the first memory until a delivery acknowledgment of a previous order-sensitive transaction is received in the hardware. For instance, the hardware may hold delivery of a second (subsequent) order-sensitive transaction to a second memory until a delivery acknowledgement of a first (prior) order-sensitive transaction is received from the first memory in the hardware. For example, referring to FIGS. 6 and 7, controller 602 may include hardware (e.g., hardware block 636, 702), which holds delivery of each order-sensitive transaction 704 including message pointer 612 to the TCR 622 until a delivery acknowledgment 638, 720 of a previous order-sensitive transaction including message 610 (the message associated with that message pointer) is received in the hardware block 636, 702. Similarly the hardware may hold delivery of order-sensitive transactions 704 including messages 610 to the descriptor RAM 616 until delivery acknowledgment 638, 720 of a previous order-sensitive transaction including message pointer 612 (the message pointer associated with a different message) is received in the hardware block 636, 702. The holding in either case may be performed by, for example, buffer 718, which stores each order-sensitive transaction 704 without outputting that transaction until the delivery acknowledgment 638, 720 of a previous order-sensitive transaction is received in buffer 718.

As represented by block 810, the controller may route a second order-sensitive transaction to a second memory in response to a second destination memory address matching one of the configured memory addresses (e.g., being within a configured memory address range). The second memory may comprise a TCR for storing the descriptor pointer. Moreover, as represented by block 812, the controller may route the order-sensitive transactions to the first and second memories through a same path in the hardware. For instance, referring to FIGS. 6 and 7, controller 602 may include hardware (e.g., hardware block 636, 702) which routes order-sensitive transactions 704 including message pointers 612 to TCR 622. Similar to the routing performed at 806, the routing here may also be performed by, for example, switch 716, which is in turn again controlled by comparator 714, and the comparator may trigger the switch to route an order-sensitive transaction along the top path of FIG. 7 in response to the memory destination address 712 of that transaction matching one of the configured memory addresses 710 (e.g., being in this case within range of addresses 624). Thus, order-sensitive transactions including messages 610 and message pointers 612 may both be routed along the same path in hardware block 636, 702 (e.g., the top path from switch 716 in FIG. 7).

As represented by block 814, the controller may route an order-insensitive transaction to a third memory in response to a third destination memory address not matching any of the configured memory addresses (e.g., not being within a configured memory address range). Moreover, as represented by block 816, the controller may route the order-sensitive transactions and the order-insensitive transactions respectively through different paths in the hardware. For instance, referring to FIGS. 6 and 7, controller 602 may include hardware (e.g., hardware block 636, 702) which routes order-insensitive transactions 706 including other instructions 628 to memory 630 (or a different memory than descriptor RAM 616 and TCR 622). Similar to the routing performed at 806 and 810, the routing here may also be performed by, for example, switch 716, which is in turn again controlled by comparator 714, and the comparator may trigger the switch to route an order-insensitive transaction along the bottom path of FIG. 7 in response to the memory destination address 712 of that transaction not matching one of the configured memory addresses 710 (e.g., not being in this case within range of addresses 618 or 624, but instead being within range of addresses 634). Thus, order-insensitive transactions 706 may be routed along a different path in hardware block 636, 702 (e.g., the bottom path from switch 716 in FIG. 7) than order-sensitive transactions including messages 610 and message pointers 612 (e.g., which are routed along the top path from switch 716 in FIG. 7).

Finally, as represented by block 818, the controller may deliver the order-insensitive transaction to the third memory without waiting for a delivery acknowledgement of a previous order-insensitive transaction. For instance, referring to FIGS. 6 and 7, controller 602 may include hardware (e.g., hardware block 636, 702), which delivers order-insensitive transactions 706 including other instructions 628 to memory 630 (or a different memory than descriptor RAM 616 and TCR 622) without waiting for delivery acknowledgments 638, 720 of previous order-insensitive transactions. For example, as illustrated in FIG. 7, the bottom path from switch 716 may not be routed to buffer 718, and thus the order-insensitive transactions routed from switch 716 may be delivered to the memory 630 at maximum throughput without being stalled by preceding order-sensitive transactions.

Figure 9:
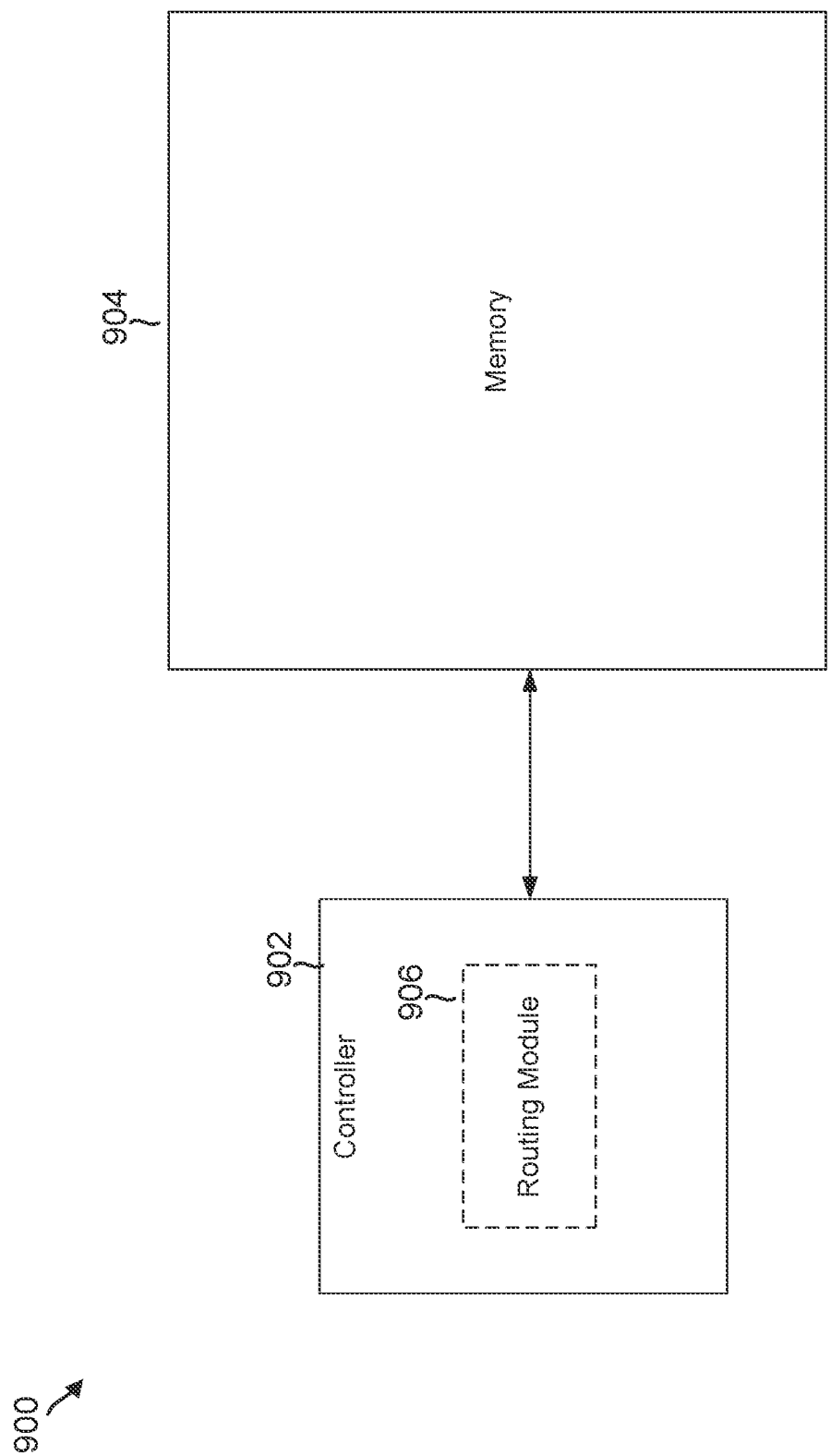
FIG. 9 is a conceptual diagram illustrating an example of a controller including a routing module that routes order-sensitive transactions and order-insensitive transactions to different memories in the storage device of FIG. 1.

FIG. 9 is a conceptual diagram illustrating an example 900 of a controller 902 coupled to a memory 904 in a storage device. For example, controller 902 may correspond to controller 123, 602 and memory 904 may correspond to the NVM 110, 604 of the storage device 102 in FIG. 1. The controller may be implemented in software, hardware, or a combination of hardware and software. In one exemplary embodiment, the controller is implemented with several software modules executed on one or more processors, but as those skilled in the art will appreciate, the controller may be implemented in different ways. The skilled artisan will readily understand how best to implement the controller based on the particular design parameters of the system.

In one example, the controller 902 includes a routing module 906 that may provide a means for routing an order-sensitive transaction to a first memory in response to a first destination memory address matching one of a plurality of configured memory addresses (e.g., as described above at block 806 in FIG. 8), and for routing an order-insensitive transaction to a second memory in response to a second destination memory address not matching any of the configured memory addresses (e.g., as described above at block 814 in FIG. 8). For example, the routing module 906 may perform the process or algorithm described above at blocks 806 and 814 with respect to FIG. 8. In another example, the routing module 906 may provide a means for routing a message to a first memory in response to a first destination memory address being within a range of configured memory addresses (e.g., as described above at block 806 in FIG. 8), for routing a message pointer to a second memory in response to a second destination memory address being within a range of configured memory addresses (e.g., as described above at block 810 in FIG. 8), and for holding delivery of the message pointer to the second memory until a delivery acknowledgement of the message is received from the first memory (e.g., as described above at block 808 in FIG. 8). For example, the routing module 906 may perform the process or algorithm described above at blocks 806, 808, and 810 with respect to FIG. 8. In another example, the routing module 906 may provide a means for routing a message to a first memory in response to a first destination memory address being within a range of configured memory addresses (e.g., as described above at block 806 in FIG. 8), for routing a message pointer to a second memory in response to a second destination memory address being within the range of configured memory addresses (e.g., as described above at block 810 in FIG. 8), and for routing an order-insensitive transaction to a third memory in response to a third destination memory address not being within the range of configured memory addresses (e.g., as described above at block 814 in FIG. 8). For example, the routing module 906 may perform the process or algorithm described above at blocks 806, 810, and 814 with respect to FIG. 8.

Accordingly, the hardware block of the present disclosure allows the controller to more efficiently prevent message pointers from being stored prior to associated messages in comparison to typical approaches involving memory barriers and proxy blocks. For example, the buffering and outputting performed by the FIFO buffer in the hardware block may be faster than the memory barriers implemented in the front-end processor or a proxy block using firmware and/or software. The hardware block may also result in less complexity and reduced latency compared to proxy blocks, which may inefficiently increase transaction delay as more messages and pointers are cached and associated. As the configuration register 708 is programmed during initialization rather than run-time, the configuration may efficiently save run-time cycles and reduce consumption of processing power within a large initialization time budget for the storage device, thus leading to improved performance without impacting performance during run-time.

Moreover, if the configured memory addresses or other target memory addresses for order-sensitive transactions are within a single address range, the time spent by the comparator in making the comparison may be faster than if the configured or target memory addresses are in multiple address ranges or individual memory addresses. For instance, the comparator may perform a truncated comparison, rather than a full comparison, of each memory destination address against the single address range in the configuration register or other target address range. For example, referring to FIG. 7, the comparator 714, 724 may compare the memory destination address 712 against one or more most significant bits of the configured or target memory addresses, rather than against every bit of the configured or target memory addresses, thereby resulting in rapid switching/routing within hardware block 702.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
    a first processor and a second processor, the first processor being configured to provide a plurality of transactions to the second processor, the transactions including an order-sensitive transaction associated with a first destination memory address and an order-insensitive transaction associated with a second destination memory address;
    a plurality of memories, the memories comprising a first memory including the first destination memory address and a second memory including the second destination memory address; and
    hardware configured to route the order-sensitive transaction to the first memory in response to the first destination memory address matching one of a plurality of configured memory addresses, and to route the order-insensitive transaction to the second memory in response to the second destination memory address not matching any of the configured memory addresses.

2. The storage device of claim 1, wherein the first processor or the second processor is configured to program the configured memory addresses in a configuration register coupled to the hardware during initialization of the storage device.

3. The storage device of claim 1, wherein the order-sensitive transaction includes a descriptor or a descriptor pointer.

4. The storage device of claim 3, wherein the first memory comprises a random access memory (RAM) for storing the descriptor or a tightly coupled register (TCR) for storing the descriptor pointer.

5. The storage device of claim 1, wherein the hardware is further configured to hold delivery of the order-sensitive transaction to the first memory until a delivery acknowledgement of a previous order-sensitive transaction is received in the hardware.

6. The storage device of claim 1, wherein the hardware is further configured to deliver the order-insensitive transaction to the second memory without waiting for a delivery acknowledgment of a previous order-insensitive transaction.

7. The storage device of claim 1, wherein the configured memory addresses are within a memory address range, and the hardware is configured to route the order-sensitive transaction to the first memory in response to the first destination memory address being within the memory address range and to route the order-insensitive transaction to the second memory in response to the second destination memory address not being within the memory address range.

8. The storage device of claim 1, wherein the hardware is configured to route the order-sensitive transaction and the order-insensitive transaction through different paths in the hardware.

9. A storage device, comprising:
    a first processor and a second processor, the first processor being configured to provide a message associated with a first destination memory address and a message pointer associated with a second destination memory address;
    a plurality of memories, the memories comprising a first memory including the first destination memory address for storing the message and a second memory including the second destination memory address for storing the message pointer; and
    hardware configured to route the message to the first memory in response to the first destination memory address being within a range of configured memory addresses, to route the message pointer to the second memory in response to the second destination memory address being within the range of configured memory addresses, and to hold delivery of the message pointer to the second memory until a delivery acknowledgement of the message is received from the first memory.

10. The storage device of claim 9, wherein the first processor or the second processor is configured during initialization of the storage device to program the configured memory addresses in a configuration register connected to the hardware.

11. The storage device of claim 9, wherein the first memory comprises a random access memory (RAM) for storing the message, and the second memory comprises a tightly coupled register (TCR) for storing the message pointer.

12. The storage device of claim 9, wherein the first processor is further configured to provide to the second processor an order-insensitive transaction associated with a third destination memory address, the memories further comprise a third memory including the third destination memory address, and the hardware is further configured to route the order-insensitive transaction to the third memory in response to the third destination memory address not being within the range of configured memory addresses.

13. The storage device of claim 12, wherein the hardware is further configured to deliver the order-insensitive transaction to the third memory without waiting for a delivery acknowledgment of a previous order-insensitive transaction.

14. The storage device of claim 9, wherein the hardware is configured to route the message and the message pointer through a same path in the hardware.

15. A storage device, comprising:
    a controller comprising a front-end processor and a back-end processor, the front-end processor being configured to provide a message associated with a first destination memory address, a message pointer associated with a second destination memory address, and an order-insensitive transaction associated with a third destination memory address;
    a plurality of memories, the memories comprising a first memory including the first destination memory address, a second memory including the second destination memory address, and a third memory including the third destination memory address; and hardware configured to route the message to the first memory in response to the first destination memory address being within a range of configured memory addresses, to route the message pointer to the second memory in response to the second destination memory address being within the range of configured memory addresses, and to route the order-insensitive transaction to the third memory in response to the third destination memory address not being within the range of configured memory addresses.

16. The storage device of claim 15, wherein the front-end processor or the back-end processor is configured to program the configured memory addresses in a configuration register coupled to the hardware during initialization of the storage device.

17. The storage device of claim 15, wherein the first memory comprises a random access memory (RAM) for storing the message, the second memory comprises a tightly coupled register (TCR) for storing the message pointer, and the third memory comprises a different memory than the RAM and the TCR.

18. The storage device of claim 15, wherein the hardware is further configured to hold delivery of the message pointer to the second memory until a delivery acknowledgement of the message is received in the hardware from the first memory.

19. The storage device of claim 15, wherein the hardware is further configured to deliver the order-insensitive transaction to the third memory without waiting for a delivery acknowledgment of a previous order-insensitive transaction.

20. The storage device of claim 15, wherein the hardware is configured to route the message and the message pointer through a first path in the hardware, and to route the order-insensitive transaction through a second path in the hardware.

* * * * *